(12) United States Patent
Makii

(10) Patent No.: US 7,428,376 B2
(45) Date of Patent: Sep. 23, 2008

(54) LENS DRIVING MECHANISM, LENS UNIT AND IMAGE PICKUP APPARATUS

(75) Inventor: Tatsuo Makii, Tokyo (JP)

(73) Assignee: Sony Corporation (JP)

( * ) Notice: Subject to any disclaimer, the term of this patent is extended or adjusted under 35 U.S.C. 154(b) by 427 days.

(21) Appl. No.: 11/374,314

(22) Filed: Mar. 14, 2006

(65) Prior Publication Data

US 2006/0215283 A1    Sep. 28, 2006

(30) Foreign Application Priority Data

Mar. 23, 2005  (JP) .......................... P2005-083640

(51) Int. Cl.
*G03B 13/34* (2006.01)

(52) U.S. Cl. .................... 396/133; 396/248; 359/824

(58) Field of Classification Search ................ 396/133, 396/248; 359/823, 824
See application file for complete search history.

(56) References Cited

U.S. PATENT DOCUMENTS

| 5,146,071 A * | 9/1992 | Ookubo et al. ........... 250/201.2 |
| 5,768,038 A * | 6/1998 | Emura ........................ 359/824 |
| 5,973,856 A * | 10/1999 | Kanbara ..................... 359/694 |
| 2006/0227437 A1* | 10/2006 | Makii ........................ 359/824 |

FOREIGN PATENT DOCUMENTS

| JP | 63-229401 | 9/1988 |
| JP | 02-262612 | 10/1990 |
| JP | 04-359684 | 12/1992 |
| JP | 05-323058 | 12/1993 |
| JP | 07-120653 | 5/1995 |
| JP | 08-262523 | 10/1996 |
| JP | 10-144975 | 5/1998 |
| JP | 2000-077736 | 3/2000 |
| JP | 2000-194026 | 7/2000 |
| JP | 2000-316120 A1 | 11/2000 |
| JP | 2001-147458 | 5/2001 |
| JP | 2002-165127 | 6/2002 |
| JP | 2003-110919 | 4/2003 |
| JP | 2003-110928 | 4/2003 |
| JP | 2003-110929 | 4/2003 |
| JP | 2003-110930 | 4/2003 |
| JP | 2003-186073 | 7/2003 |
| JP | 2003-222922 | 8/2003 |
| JP | 2003-259194 | 9/2003 |
| JP | 2004-080665 | 3/2004 |
| JP | 2004-219930 | 8/2004 |

* cited by examiner

*Primary Examiner*—W. B. Perkey
*Assistant Examiner*—Warren K Fenwick
(74) *Attorney, Agent, or Firm*—Rader Fishman & Grauer PLLC; Ronald P. Kananen

(57) ABSTRACT

A lens driving mechanism is disclosed which can achieve miniaturization of the mechanism by simplification and enhancement of the reliability in position control of a movable block. The lens driving mechanism includes a piezoelectric element deformed when energized for functioning as a driving section for applying driving force to the movable block, a restriction section for restricting the movement of the movable block in the predetermined direction, and a detection section for detecting a predetermined amount regarding the piezoelectric element. The initial position of the movable block is set as a position at an extremity of the movement of the movable block within a movable range based on an inflection point of the predetermined amount detected by the detection section when the movable block moved by the deformation of the piezoelectric element is restricted by the restriction section.

7 Claims, 5 Drawing Sheets

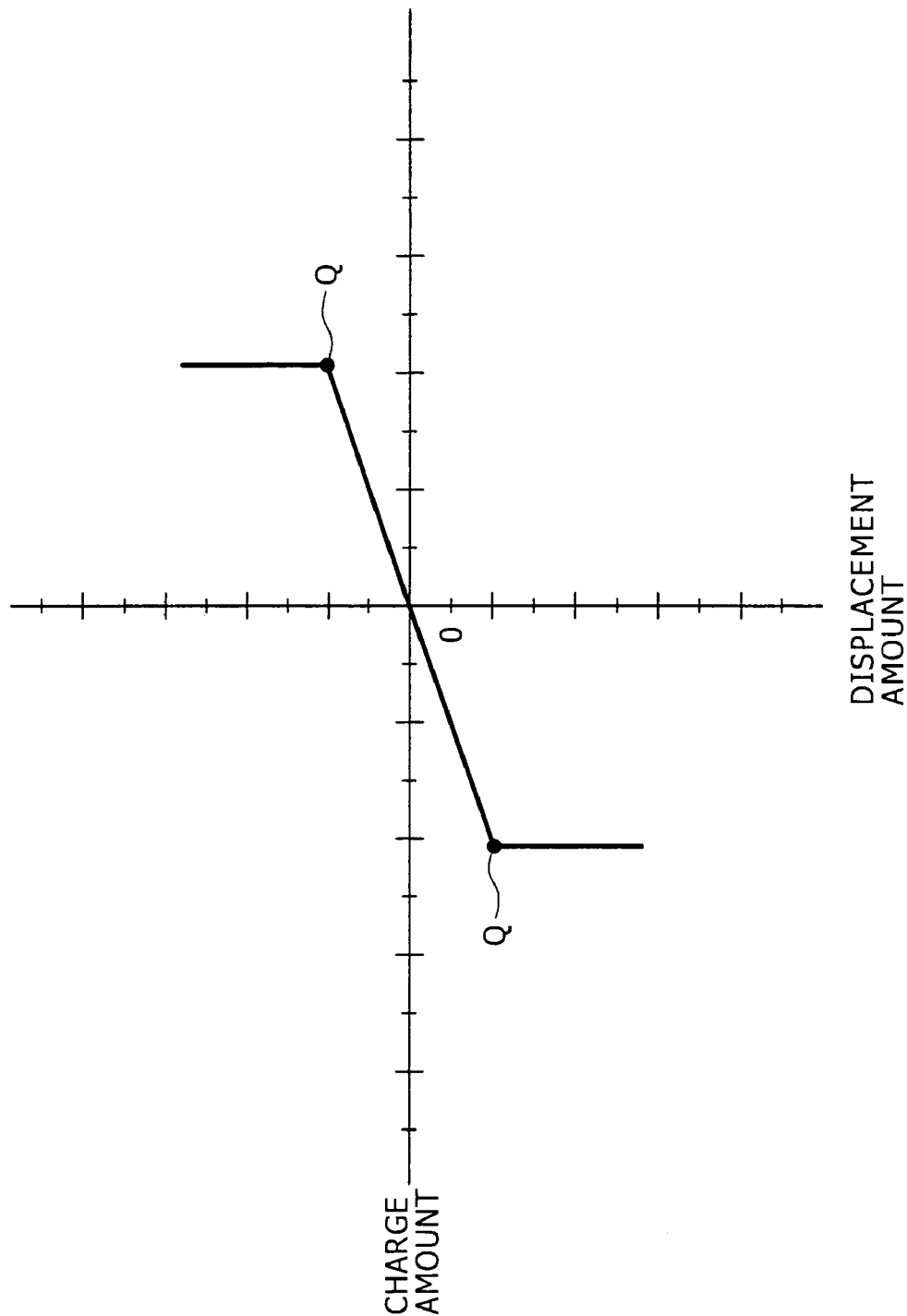

LENS DRIVING MECHANISM, LENS UNIT AND IMAGE PICKUP APPARATUS

CROSS REFERENCES TO RELATED APPLICATIONS

The present invention contains subject matter related to Japanese Patent Application JP 2005-083640, filed in the Japanese Patent Office on Mar. 23, 2005, the entire contents of which being incorporated herein by reference.

BACKGROUND OF THE INVENTION

This invention relates to a lens driving mechanism, a lens unit and an image pickup apparatus.

A lens unit wherein an image pickup optical system including a movable lens or the like and a lens driving mechanism for moving the movable lens in a predetermined direction are disposed in a lens barrel is incorporated not only in video cameras and still cameras but also in various image pickup apparatus of portable telephone sets and like devices. The movable lens cooperates with a lens holder which holds the movable lens thereon to form a movable block. The movable block is moved by the lens driving mechanism in a direction of an optical axis to perform focusing or zooming and also in a direction perpendicular to the optical axis to perform correction against a blur.

One of such lens driving mechanisms as described above uses a linear actuator formed from a driving coil, a driving magnet and so forth as disclosed, for example, in Japanese Patent No. 3387173 (hereinafter referred to as Patent Document 1).

SUMMARY OF THE INVENTION

However, since, in such a conventional image pickup apparatus as described above, a linear actuator formed form a driving coil, a driving magnet and so forth is used for the lens driving mechanism, the image pickup apparatus has a problem in that it requires a complicated structure and an increased arrangement space due to the arrangement of the driving coil, driving magnet and so forth, resulting in increase of the scale of the image pickup apparatus.

Further, not only when the movable block is moved within a movable range thereof, but also when the movable block is held at a desired position within the movable range thereof, the driving coil must always be kept energized. Therefore, the conventional image pickup apparatus is disadvantageous in that the power consumption is high as much.

On the other hand, while the movable block is moved within the movable range thereof set in advance, since image pickup apparatus fabricated actually suffer from a dispersion of the movable range caused by an error in assembly of parts and so forth, it is preferable to perform unique position control for the movable block for each image pickup apparatus. Particularly, an initial position of the movable block which is an end of movement within the movable range must be set accurately.

It is a desire of the present invention to provide a lens driving mechanism, a lens unit and an image pickup apparatus which can achieve miniaturization of the mechanism by simplification and enhancement of the reliability in position control of a movable block.

In order to attain the desire described above, according to the present invention, a piezoelectric element is used as a driving section for moving a movable block, and a predetermined amount regarding the piezoelectric element is detected and used for position control of the movable block.

In particular, according to an embodiment of the present invention, there is provided a lens driving mechanism for moving a movable block having a movable lens in a predetermined direction, including a piezoelectric element deformed when energized for functioning as a driving section for applying driving force to the movable block, a restriction section for restricting the movement of the movable block in the predetermined direction, and a detection section for detecting a predetermined amount regarding the piezoelectric element, an initial position of the movable block being set as a position at an extremity of the movement of the movable block within a movable range based on an inflection point of the predetermined amount detected by the detection section when the movable block moved by the deformation of the piezoelectric element is restricted by the restriction section.

In the lens driving mechanism, when the movable block is restricted by the restriction section, setting of an initial position of the movable block is performed.

Therefore, with the lens driving mechanism, since a piezoelectric element is used as the driving section and the initial position of the movable block is set when the movable block is restricted by the restriction section, miniaturization of a lens driving mechanism can be achieved and the setting of the initial position can be set with ease.

Preferably, the movable range of the movable block is set based on the set initial position of the movable block. With the lens driving mechanism, facilitation in operation control of the movable block and enhancement of the reliability in operation of the movable block can be anticipated.

The detection section may include a strain gauge which detects an amount of distortion appearing with the piezoelectric element. The use of a strain gauge facilitates the detection without giving rise to an increase of the fabrication cost.

Alternatively, the detection section may include a charge sensor which detects an amount of charge accumulated in the piezoelectric element. Also the use of a charge sensor facilitates the detection without giving rise to an increase of the fabrication cost.

Preferably, the lens driving mechanism further includes another restriction section provided in a spaced relationship from the restriction section in the direction of movement of the movable block, the movable range of the movable block being set based on initial positions individually set when the movable block moved by the deformation of the piezoelectric element is restricted by the restriction sections. With the lens driving mechanism, the reliability in control of movement of the movable block can be enhanced.

According to another embodiment of the present invention, there is provided a lens unit including a movable block having a movable lens, and a lens driving mechanism for moving the movable block in a predetermined direction, the lens driving mechanism having a piezoelectric element deformed when energized for functioning as a driving section for applying driving force to the movable block, a restriction section for restricting the movement of the movable block in the predetermined direction, and a detection section for detecting a predetermined amount regarding the piezoelectric element, an initial position of the movable block being set as a position at an extremity of the movement of the movable block within a movable range based on an inflection point of the predetermined amount detected by the detection section when the movable block moved by the deformation of the piezoelectric element is restricted by the restriction section.

In the lens unit, when the movable block is restricted by the restriction section, setting of an initial position of the movable block is performed.

Therefore, with the lens unit, since a piezoelectric element is used as the driving section and the initial position of the movable block is set when the movable section is restricted by the restriction section, miniaturization of a lens driving mechanism can be achieved and the setting of the initial position can be set with ease.

According to a further embodiment of the present invention, there is provided an image pickup apparatus including a movable block having a movable lens, a lens driving mechanism for moving the movable block in a predetermined direction, an image pickup optical system, and an image pickup element for converting an image formed by the image pickup optical system into an electric signal, the lens driving mechanism having a piezoelectric element deformed when energized for functioning as a driving section for applying driving force to the movable block, a restriction section for restricting the movement of the movable block in the predetermined direction, and a detection section for detecting a predetermined amount regarding the piezoelectric element, an initial position of the movable block being set as a position at an extremity of the movement of the movable block within a movable range based on an inflection point of the predetermined amount detected by the detection section when the movable block moved by the deformation of the piezoelectric element is restricted by the restriction section.

In the image pickup apparatus, when the movable block is restricted by the restriction section, setting of an initial position of the movable block is performed.

Therefore, with the image pickup apparatus, since a piezoelectric element is used as the driving section and the initial position of the movable block is set when the movable section is restricted by the restriction section, miniaturization of a lens driving mechanism can be achieved and the setting of the initial position can be set with ease.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 4 and 5 are graphs illustrating relationships between the displacement amount of the piezoelectric element and the charge amount detected by a detection section of the image pickup apparatus.

DETAILED DESCRIPTION OF THE PREFERRED EMBODIMENT

Figure 1:
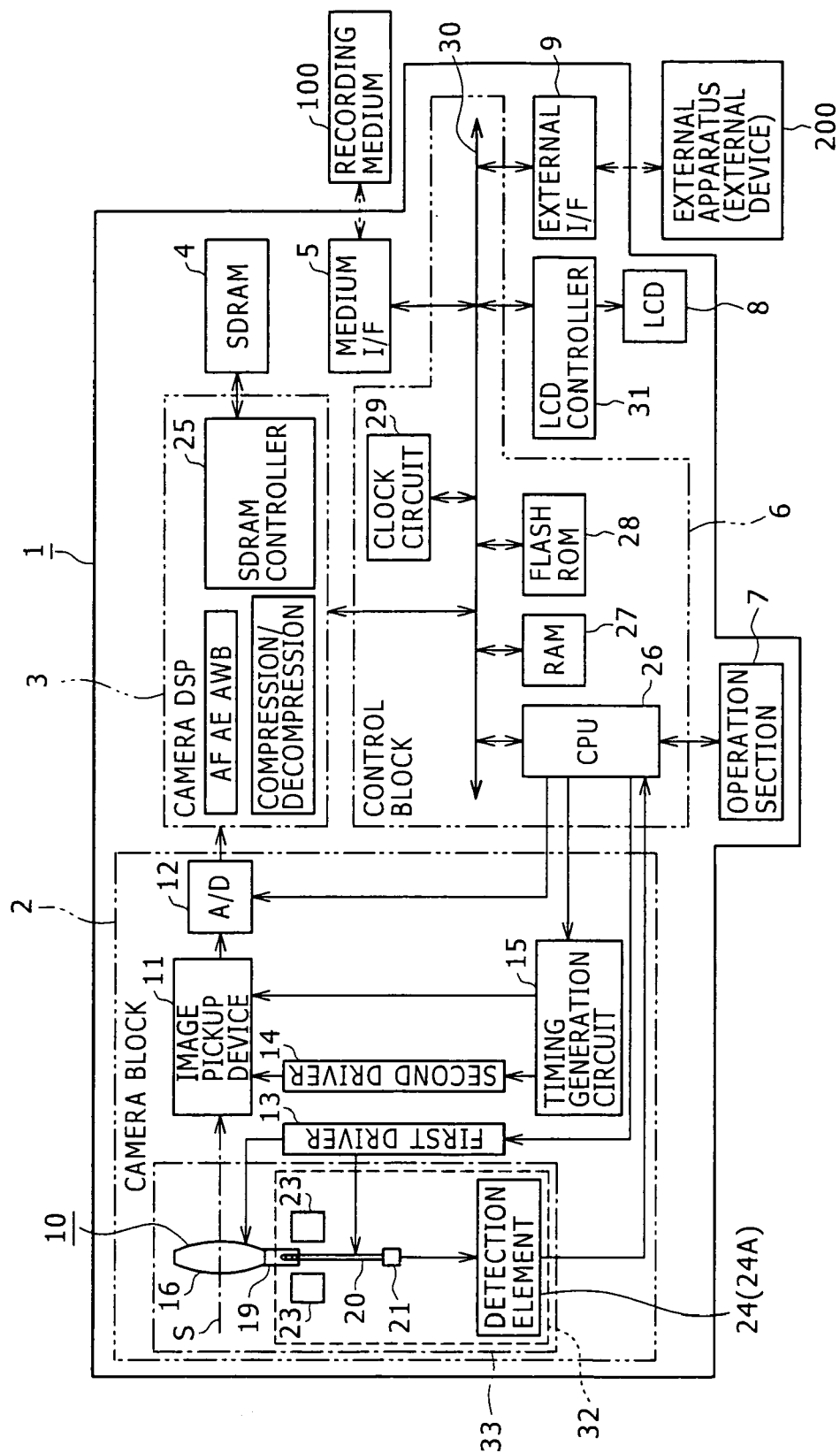
FIG. 1 is a block diagram showing a general configuration of an image pickup apparatus to which the present invention is applied.

Although the present invention can be applied to various image pickup apparatus which have a moving picture image pickup function or a still picture image pickup function such as portable telephone sets, video cameras and still cameras and also to various lens units and lens driving mechanisms used in such image pickup apparatus, a general configuration of an image pickup apparatus to which the present invention is described first with reference to FIG. 1.

The image pickup apparatus 1 includes a camera block 2, a camera DSP (Digital Signal Processor) 3, an SDRAM (Synchronous Dynamic Random Access Memory) 4, a medium interface (I/F) S, a control block 6, an operation section 7, a LCD (Liquid Crystal Display) unit 8 and an external interface (I/F) 9. A recording medium 100 can be removably loaded into the external interface 9.

For the recording medium 100, various media can be used including memory cards in which a semiconductor memory is incorporated and disk-type recording media such as a recordable DVD (Digital Versatile Disk) and a recordable CD (Compact Disk).

The camera block 2 includes a movable block 10, an image pickup device 11 such as a CCD (Charge Coupled Device) image pickup device, an A/D conversion circuit 12, a first driver 13, a second driver 14 and a timing generation circuit 15.

Figure 2:
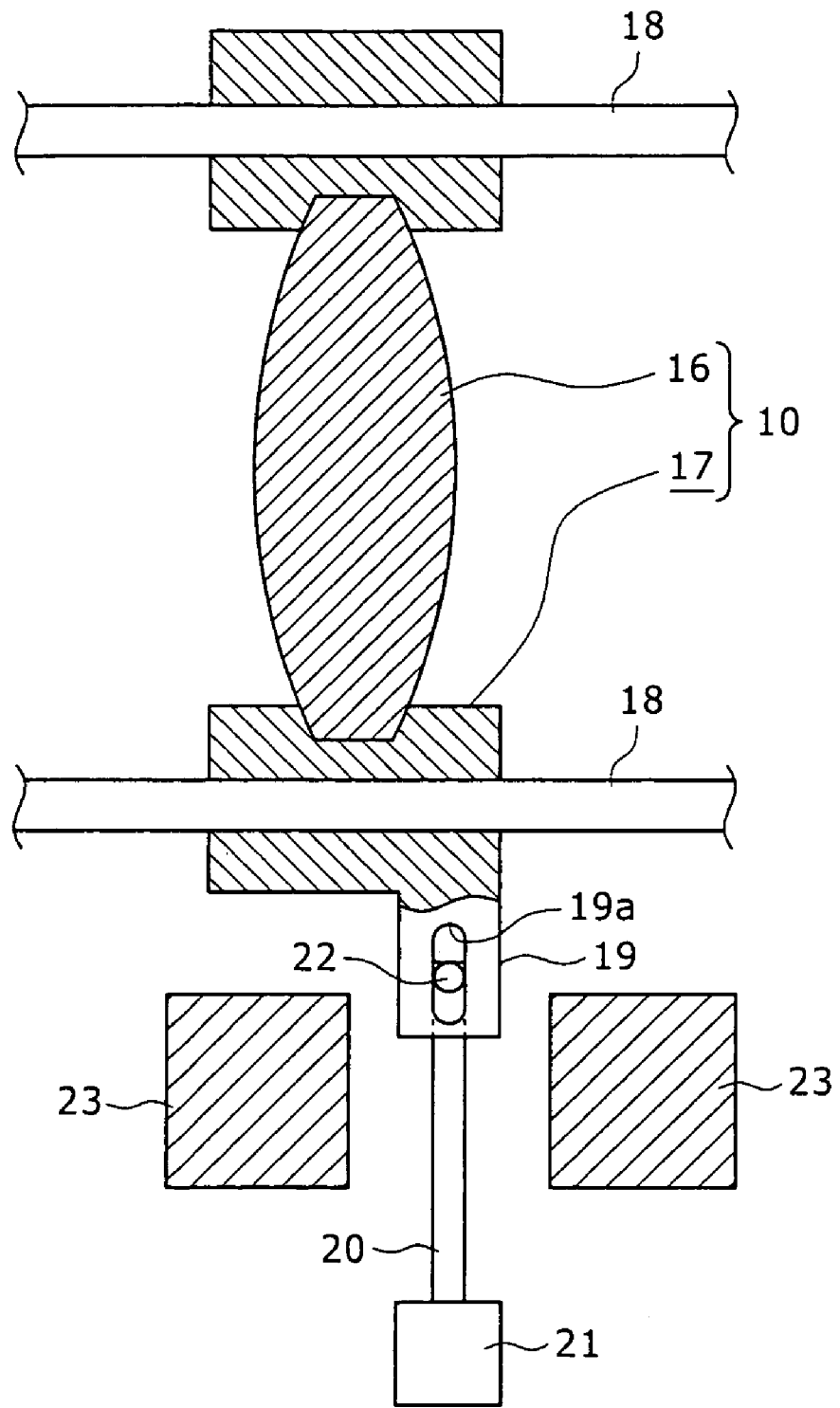
FIG. 2 is an enlarged schematic sectional view, partly in section, showing a piezoelectric element before it is deformed together with a movable block of the image pickup apparatus.

The movable block 10 includes a movable lens 16 such as, for example, a focusing lens and a zoom lens, and a lens holder 17 for holding the movable lens 16 thereon as particularly shown in FIG. 2. Referring to FIG. 2, the movable block 10 is supported at the lens holder 17 thereof for sliding movement on a pair of guide rods 18 extending in the direction of an optical axis such that it moves in a direction of the optical axis under the guidance of the guide rods 18.

A projection 19 is provided on the lens holder 17 such that, for example, it projects downwardly, and a support hole 19a is formed in an upwardly and downwardly elongated shape in the projection 19.

Referring back to FIG. 1, the image pickup device 11 operates in response to a driving signal from the second driver 14 and fetches an image of a subject fetched through the movable lens 16. Then, the image pickup device 11 signals the fetched image (image information) of the subject as an electric signal to the A/D conversion circuit 12 in response to a timing signal outputted from the timing generation circuit 15 which is controlled by the control block 6.

It is to be noted that the image pickup device 11 is not limited to a CCD device, but some other device such as, for example, a CMOS (Complementary Metal-Oxide Semiconductor) device can be used as the image pickup device 11.

The AID conversion circuit 12 performs a CDS (Correlated Double Sampling) process for the image information as the inputted electric signal to maintain a good S/N ratio and performs an AGC (Automatic Gain Control) process to control the gain. The A/D conversion circuit 12 further performs an A/D (Analog/Digital) conversion process to produce image data in the form of a digital signal.

The first driver 13 transmits a driving signal to a piezoelectric element hereinafter described in accordance with an instruction of a CPU hereinafter described of the control block 6.

The second driver 14 transmits a driving signal to the image pickup device 11 based on a timing signal outputted from the timing generation circuit 15.

The timing generation circuit 15 generates a timing signal for providing a predetermined timing under the control of the control block 6.

The camera block 2 includes a piezoelectric element 20 which functions as a driving section for moving the movable block 10, for example, in a direction of an optical axis S (refer to FIG. 1). The piezoelectric element 20 is deformed in a substantially fixed radius of curvature when it is energized. At this time, charge is accumulated into the piezoelectric element 20. The piezoelectric element 20 is secured at an end portion (lower end portion) thereof to a fixed member 21 and is deformed in a direction corresponding to the direction of the optical axis.

While piezoelectric elements are roughly classified into the bimorph type and the unimorph type, for example, a bimorph type piezoelectric element is used as the piezoelectric element 20 of the camera block 2. It is to be noted, however, that the piezoelectric element 20 may alternatively be used the unimorph type.

Referring to FIG. 2, an engaging pin 22 is attached to an end portion (upper end portion) of the piezoelectric element 20. The engaging pin 22 is supported for sliding movement in the support hole 19a formed in the lens holder 17 of the movable block 10.

A pair of restriction members 23 are provided in the camera block 2. The restriction members 23 are provided in a spaced relationship from each other in the direction of the optical axis and disposed at positions at which, for example, they can contact with the projection 19 of the lens holder 17 and play a roll of restricting the movement of the movable block 10 in the direction of the optical axis.

Referring back to FIG. 1, a detection element 24 is provided on the camera block 2. A strain gauge is used as the detection element 24 and detects a predetermined amount regarding the piezoelectric element 20 such as, for example, a distortion amount appearing with the piezoelectric element 20. The strain gauge is attached to the piezoelectric element 20. An output of the strain gauge is processed, for example, by a bridge circuit not shown.

The camera DSP 3 performs signal processing for image data inputted thereto from the A/D conversion circuit 12 such as AF (Autofocus), AE (Automatic Exposure) and AWB (Auto White Balance). Image data for which the signal processing such as AF, AE and AWB has been performed are compressed by a predetermined method and outputted to the recording medium 100 through the control block 6 so that they are recorded as a file on the recording medium 100.

The camera DSP 3 includes an SDRAM controller 25 and performs writing and reading of data at a high speed into and from the SDRAM 4 in accordance with an instruction of the SDRAM controller 25.

The control block 6 is a microcomputer formed from a CPU (Central Processing Unit) 26, a RAM (Random Access Memory) 27, a flash ROM (Read Only Memory) 28, a clock circuit 29 and other circuits connected to each other through a system bus 30. The control block 6 has a function of controlling the components of the image pickup apparatus 1.

The CPU 26 signals an instruction signal to the second driver 14 and so fourth through the first driver 13 and the timing generation circuit 15 so that the components may operate.

The RAM 27 is used principally as a working area for temporarily storing intermediate results of processing and so forth.

The flash ROM 28 stores therein various programs to be executed by the CPU 26, data necessary for processes of the CPU 26 and so forth.

The clock circuit 29 outputs the year, month and day at present, the day of the week at present, the hour at present, the date and hour of image pickup and so forth.

The operation section 7 includes a touch panel, control keys and so forth provided on a housing of the image pickup apparatus 1. A signal corresponding to an operation of the operation section 7 is inputted to the CPU 26, and instruction signals are signaled from the CPU 26 to pertaining components of the image pickup apparatus 1 based on the signal inputted thereto from the operation section 7.

The LCD unit 8 is provided, for example, on the housing and controlled by an LCD controller 31 connected to the system bus 30. The LCD unit 8 displays thereon various kinds of information such as image data based on a driving signal from the LCD controller 31.

The external interface 9 is connected to the system bus 30. The image pickup apparatus 1 is connected to an external apparatus (external device) 200 such as, for example, an external personal computer through the external interface 9 such that it can receive image data from the personal computer and records the image data on the recording medium 100 or output image data recorded on the recording medium 100 to the personal computer or the like. It is to be noted that the recording medium 100 is connected to the control block 6 through the medium interface 5 connected to the system bus 30.

Further, where the external apparatus 200, for example, a communication module, is connected to the external interface 9, it is possible to connect the image pickup apparatus 1 to a network such as, for example, the Internet and acquire various image data or other information through the network and record the data and/or information on the recording medium 100 or transmit data recorded on the recording medium 100 to an opposite party of communication through the network.

It is to be noted that it is possible to provide the external interface 9 as an interface for wire communication such as an IEEE (Institute of Electrical and Electronics Engineers) 1394 interface or a USB (Universal Serial Bus) interface or as an interface for wireless communication which makes use of light or radio waves.

Meanwhile, image data recorded on the recording medium 100 are read out from the recording medium 100 in response to an operation signal based on an operation of the operation section 7 performed by the user and signaled to the camera DSP 3 through the medium interface 5.

The camera DSP 3 performs a decompression process for image data in a compressed form read out from the recording medium 100 and inputted thereto and transmits the decompressed image data to the LCD controller 31 through the system bus 30. The LCD controller 31 transmits an image signal based on the received image data to the LCD unit 8. The LCD unit 8 displays an image thereon based on the received image signal.

In the image pickup apparatus 1 having such a configuration as described above, the piezoelectric element 20, engaging pin 22, restriction members 23 and detection element 24 serve as components of a lens driving mechanism 32 which controls the movement of the movable block 10, and the lens driving mechanism 32 and the movable block 10 serve as components of a lens unit 33 (refer to FIG. 1).

In the image pickup apparatus 1, if a driving signal is outputted from the first driver 13 to the piezoelectric element 20 in accordance with an instruction from the CPU 26, then a driving voltage is applied from a power supply circuit not shown to the piezoelectric element 20.

Figure 3:
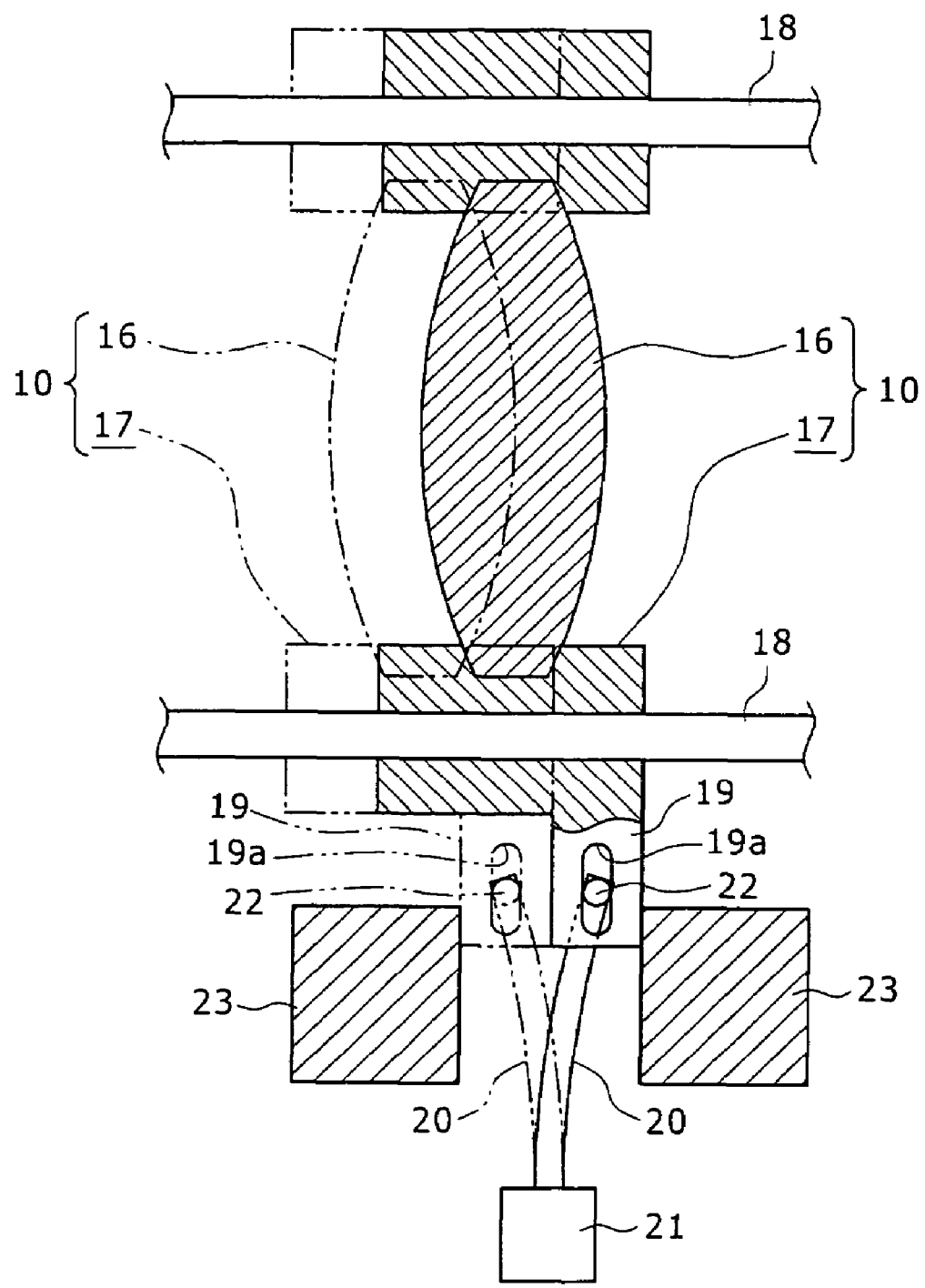
FIG. 3 is a similar view but showing the piezoelectric element after it is deformed together with the movable block.

When the driving voltage is applied to the piezoelectric element 20, the piezoelectric element 20 is deformed, and the movable block 10 is moved in a direction of the optical axis under the guidance of the guide rods 18 by the deformation of the piezoelectric element 20 to perform a focusing movement or a zooming movement (refer to FIGS. 2 and 3). Thereupon, the engaging pin 22 attached to the piezoelectric element 20 slidably moves in the support hole 19a of the lens holder 17.

The piezoelectric element 20 is deformed in a state of a substantially uniform radius of curvature with reference to the fixed member 21. However, if the projection 19 of the lens holder 17 is brought into contact with one of the restriction members 23 and further movement of the movable block 10 in the direction of the optical axis is restricted by the restriction member 23, then the distortion amount appearing with the piezoelectric element 20 increases suddenly. The sudden increase of the distortion amount is caused by restriction of the deformation of the piezoelectric element 20 as a result of the restriction of the movement of the movable block 10 by the restriction member 23.

Figure 4:
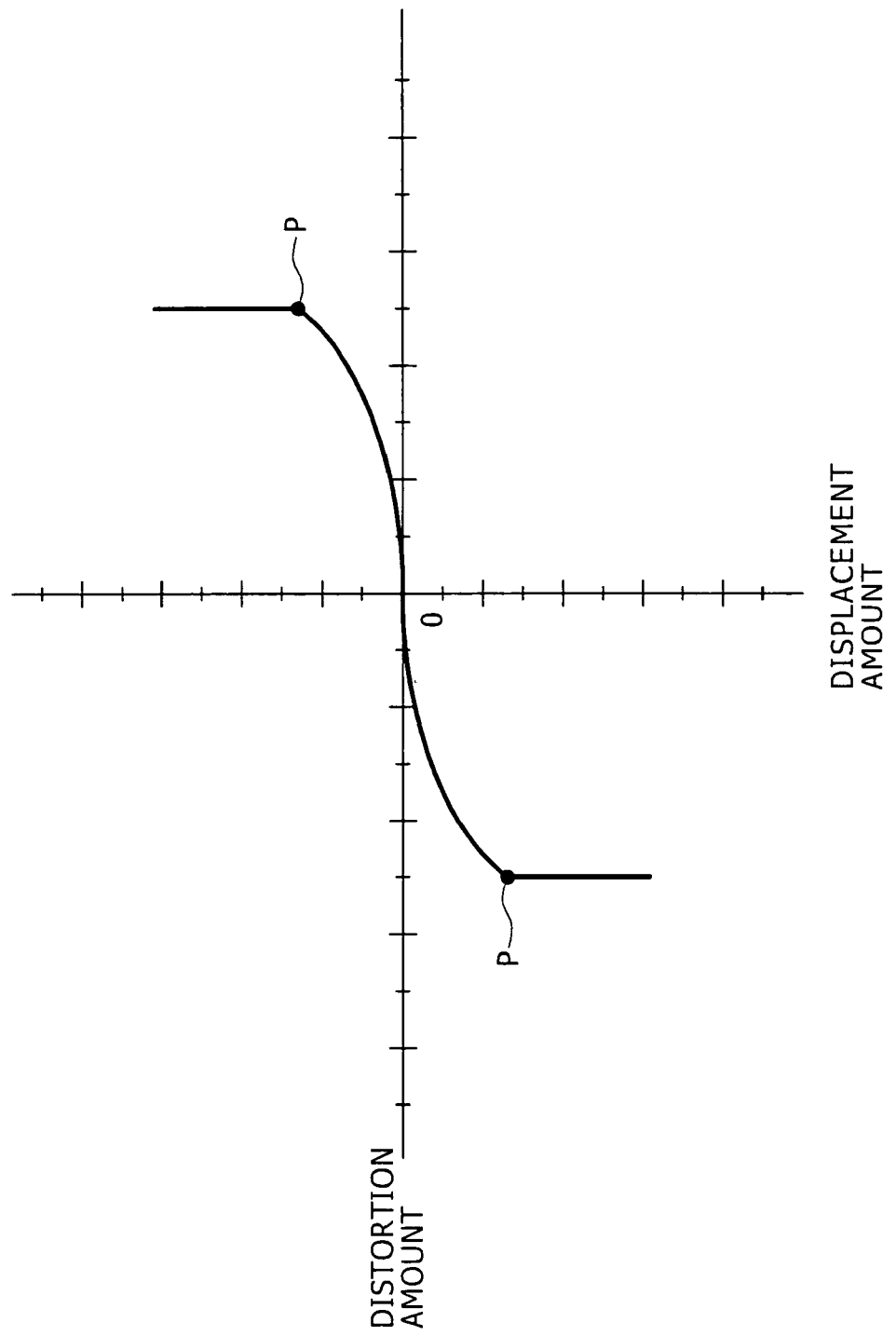

FIG. 4 illustrates a relationship between the amount of displacement of the piezoelectric element 20 and the amount of distortion of the piezoelectric element 20 detected by the detection element (strain gauge) 24.

As seen in FIG. 4, when the deformation of the piezoelectric element 20 is restricted by any of the restriction members 23, an inflection point P appears. Accordingly, the positions at which the inflection points P appear can be discriminated as extremities of the movement of the movable block 10 within the movable range of the movable block 10 in the direction of the optical axis. In the image pickup apparatus 1, an initial position as the position at an extremity of the movement of the movable block 10 within the movable range is determined based on the inflection points P. After the initial position is detected, a relationship between different positions within the movable range of the movable block 10 and addresses for use for control by the first driver 13 is established. The relationship between the positions and the addresses is stored, for example, as map information in the flash ROM 28 and is read out and used upon driving control of the piezoelectric element 20 by the first driver 13.

Further, when the detection of an initial position is performed, setting of a movable range is performed in order to allow such control that the movable block 10 can be moved only within a predetermined range. The setting of the movable range is performed such that, for example, "a range to xx mm with reference to the initial position is determined as the movable range of the movable block 10", and the set condition is stored, for example, into the flash ROM 28.

It is to be noted that, since the restriction members 23 are disposed adjacent the free end of the piezoelectric element 20 as seen in FIGS. 2 and 3, a greater moment appears on the fixed member 21 side rather than the free end side of the piezoelectric element 20 and a greater distortion amount appears with the piezoelectric element 20 while the movement of the movable block 10 is restricted by the restriction member 23 when compared with an alternative configuration wherein the restriction members 23 are provided adjacent the fixed member 21 of the piezoelectric element 20. Accordingly, the configuration that the restriction members 23 are disposed adjacent the free end of the piezoelectric element 20 facilitates the detection of any of the inflection points P by the detection element 24.

While the foregoing description relates to a case wherein the distortion amount appearing with the piezoelectric element 20 is used as the predetermined amount of the piezoelectric element 20 to be detected in order to make it possible to perform the detection of an initial position and setting of a movable range, it is otherwise possible to use, for example, the amount of charge accumulated in the piezoelectric element 20 as described below as the predetermined amount of the piezoelectric element 20 to be detected.

In particular, while the piezoelectric element 20 is deformed in a substantially uniform radius of curvature with reference to the fixed member 21 as described above, when the projection 19 of the lens holder 17 is brought into contact with one of the restriction members 23 to restrict further movement of the movable block 10 in a direction of the optical axis, then charge is accumulated by an external force acting upon the piezoelectric element 20 in addition to accumulation of charge caused by the energization. Therefore, the amount of charge accumulated in the piezoelectric element 20 increases suddenly. For example, a charge amount sensor which can be incorporated in a detection circuit is used as a detection element 24A for detecting the charge amount.

FIG. 5 illustrates a relationship between the amount of displacement of the piezoelectric element 20 and the amount of charge of the piezoelectric element 20 detected by the detection element (charge amount sensor) 24A.

As seen from FIG. 5, when the deformation of the piezoelectric element 20 is restricted by any of the restriction members 23, an inflection point Q appears. Accordingly, an initial position of the movable block 10 is detected based on any of the inflection points Q to perform setting of a movable range.

It is to be noted that it is possible to perform the detection of an initial position and the setting of a movable range in advance at an adjustment step upon fabrication of the image pickup apparatus 1, and also it is possible to set the image pickup apparatus 1 such that they can be performed at any time upon use of the image pickup apparatus 1 by the user. Where the image pickup apparatus 1 is set such that the detection and the setting can be performed at any time upon use by the user, even if the relative positions of the parts vary, for example, as a result of a secular change, the detection of an initial position and the setting of a movable range can be performed newly thereby to achieve enhancement of the reliability in control of the movement of the movable block 10.

Also it is possible to perform the setting of a movable range by detecting an inflection point P or an inflection point Q when the movement of the movable block 10 is restricted by one of the restriction members 23 and detecting an inflection point P or an inflection point Q when the movement of the movable block 10 is restricted by the other restriction member 23. In this instance, the movable range of the movable block 10 is determined with reference to the initial positions set based on the two inflection points P or the two inflection points Q. The determination of the movable range is effective particularly where the relative positions of the restriction members 23 vary, for example, as a result of a secular change.

Where the two inflection points P or the two inflection points Q are detected, also it is possible to determine the movable range of the movable block 10, for example, with reference to the central position between the positions at which the two inflection points P or the two inflection points Q are detected. Where the movable range is determined with reference to the central position in this manner, it is possible to determine the movable range as a range within which the movable block 10 does not contact with any of the restriction members 23. This can enhance the reliability in control of the movement of the movable block 10.

As described hereinabove, the image pickup apparatus 1 uses the piezoelectric element 20 as the driving section for moving the movable block 10.

Accordingly, reduction in weight of the movable block 10, simplification of the lens driving mechanism 32, simplification of a wiring operation of wiring lines and miniaturization by reduction of the arrangement space for the driving section can be enhanced.

Further, since the piezoelectric element 20 keeps a deformed state thereof even when it is in a deenergized state, the movable block 10 can be held at any position within the movable range without the necessity to keep the piezoelectric element 20 energized. Consequently, energy saving can be enhanced as much.

Further, since the setting of an initial position of the movable block 10 is performed based on an inflection point P or Q of the predetermined amount detected by the detection element 24 when the movable block 10 is restricted by any of the restriction members 23 upon deformation of the piezoelectric element 20, the initial position can be set easily and the accuracy of the initial position can be enhanced.

Furthermore, since setting of a movable range of the movable block 10 is performed with reference to the initial position set based on the predetermined amount detected by the detection element 24 or 24A, facilitation in operation control for the movable block 10 and the reliability in operation of the movable block 10 can be enhanced.

In addition, since the predetermined amount regarding the piezoelectric element 20 is detected by the detection element 24 or 24A which is a strain gauge or a charge amount sensor which are used widely as a detection device, the detection can be performed readily without involving an increase of the fabrication cost.

It is to be noted that, while the foregoing description relates to a case wherein the movable block 10 is moved in the direction of the optical axis by the lens driving mechanism 32 to perform a focusing movement or a zooming movement, the lens driving mechanism 32 is used not restrictively as a mechanism for moving the movable block 10 in the direction of the optical axis but can be used also as a mechanism, for example, for moving the movable block 10 in a plane perpendicular to the optical axis to perform correction of a picked up image against a blur. Where the lens driving mechanism 32 is used as a mechanism for correction against a blur, pertaining components should be disposed such that the piezoelectric element 20 is deformed in a direction perpendicular to the optical axis.

It is to be noted that the upward and downward directions in the foregoing description are merely for the convenience of description and the application of the present invention is not restricted by the directions.

While a preferred embodiment of the present invention has been described using specific terms, such description is for illustrative purposes only, and it is to be understood that changes and variations may be made without departing from the spirit or scope of the following claims.

What is claimed is:

1. A lens driving mechanism for moving a movable block including a movable lens in a predetermined direction, comprising:
    a piezoelectric element deformed when energized for functioning as a driving section for applying driving force to said movable block;
    a restriction section for restricting the movement of said movable block in the predetermined direction; and
    a detection section for detecting a predetermined amount regarding said piezoelectric element;
    an initial position of said movable block being set as a position at an extremity of the movement of said movable block within a movable range based on an inflection point of the predetermined amount detected by said detection section when said movable block moved by the deformation of said piezoelectric element is restricted by said restriction section.

2. The lens driving mechanism according to claim 1, wherein the movable range of said movable block is set based on the set initial position of said movable block.

3. The lens driving mechanism according to claim 1, wherein said detection section includes a strain gauge which detects an amount of distortion appearing with said piezoelectric element.

4. The lens driving mechanism according to claim 1, wherein said detection section includes a charge sensor which detects an amount of charge accumulated in said piezoelectric element.

5. The lens driving mechanism according to claim 1, further comprising another restriction section provided in a spaced relationship from said restriction section in the direction of movement of said movable block, the movable range of said movable block being set based on initial positions individually set when said movable block moved by the deformation of said piezoelectric element is restricted by said restriction sections.

6. A lens unit, comprising:
    a movable block including a movable lens; and
    a lens driving mechanism for moving said movable block in a predetermined direction;
    said lens driving mechanism including a piezoelectric element deformed when energized for functioning as a driving section for applying driving force to said movable block, a restriction section for restricting the movement of said movable block in the predetermined direction, and a detection section for detecting a predetermined amount regarding said piezoelectric element;
    an initial position of said movable block being set as a position at an extremity of the movement of said movable block within a movable range based on an inflection point of the predetermined amount detected by said detection section when said movable block moved by the deformation of said piezoelectric element is restricted by said restriction section.

7. An image pickup apparatus, comprising:
    a movable block including a movable lens;
    a lens driving mechanism for moving said movable block in a predetermined direction;
    an image pickup optical system; and
    an image pickup element for converting an image formed by said image pickup optical system into an electric signal;
    said lens driving mechanism including a piezoelectric element deformed when energized for functioning as a driving section for applying driving force to said movable block, a restriction section for restricting the movement of said movable block in the predetermined direction, and a detection section for detecting a predetermined amount regarding said piezoelectric element;
    an initial position of said movable block being set as a position at an extremity of the movement of said movable block within a movable range based on an inflection point of the predetermined amount detected by said detection section when said movable block moved by the deformation of said piezoelectric element is restricted by said restriction section.

* * * * *